March 5, 1929.　　F. CARELLA　　1,704,653
NONSLIPPING HORSESHOE
Original Filed Feb. 16, 1926
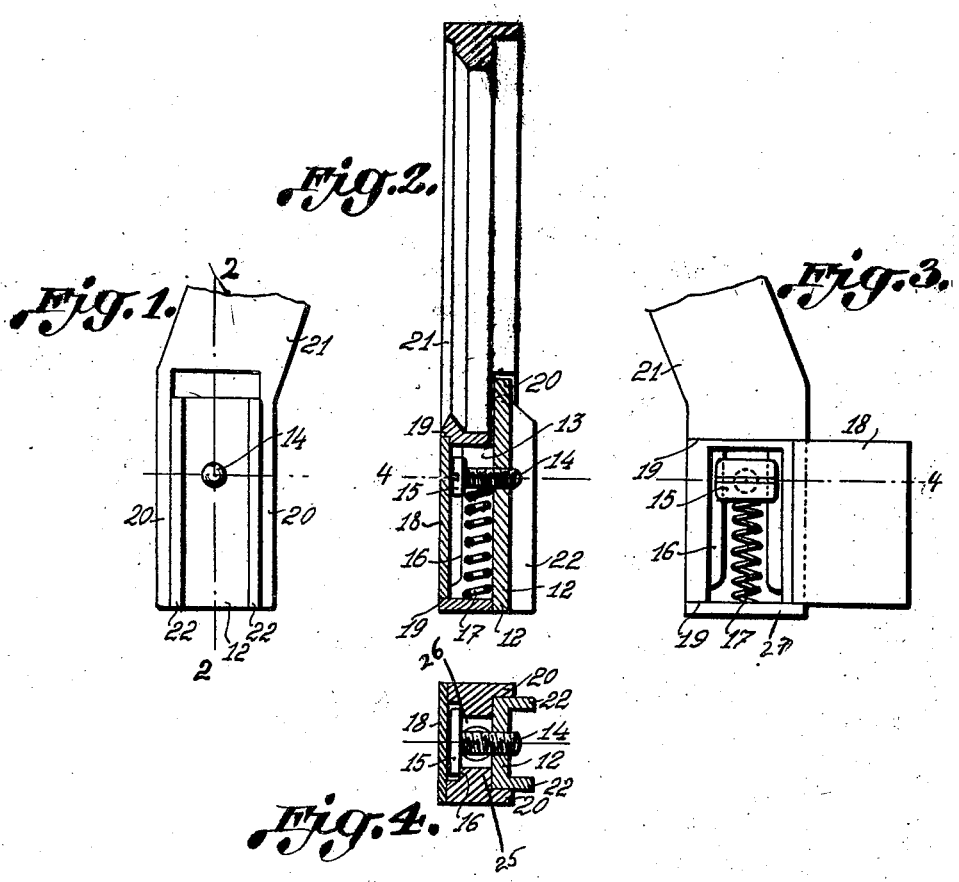
INVENTOR
Ferdinando Carella
by
Langner, Parry, Card & Langner
ATT'YS.

Patented Mar. 5, 1929.

1,704,653

UNITED STATES PATENT OFFICE.

FERDINANDO CARELLA, OF HOBOKEN, NEW JERSEY.

NONSLIPPING HORSESHOE.

Original application filed February 16, 1926, Serial No. 88,668. Divided and this application filed January 23, 1928. Serial No. 248,848.

This invention relates to horseshoes of the anti-slip type, and is a division of my application Serial No. 88,668, filed February 16, 1926.

The object of the present invention is to provide a horseshoe having one or a plurality of resilient calks adapted to grip the ground and so to prevent the animal from slipping.

Another object of the invention is to provide a horseshoe having calks constructed to absorb the shock of impact of the animal's footfall, increasing the comfort of the horse and thereby promoting his efficiency, as well as preventing lameness.

In the drawing, one adaptation of the invention is disclosed:

Fig. 1 is a bottom plan of the end of a horseshoe having a longitudinally slidable calk;

Fig. 2 is a section taken along the line 2—2 of Fig. 1;

Fig. 3 is a top plan view of the end of the horseshoe, the cover of the calk-chamber being in open position; and Fig. 4 is a cross-section taken along the line 4—4 of Figs. 2 and 3.

Referring now in detail to the several figures, each end of the horseshoe is cut out, forming a chamber or recess 26 with spaced bars 25 at the opposite sides thereof and an integral end wall 27. This recess is enlarged on the lower face of the horseshoe to form a guideway for the sliding member 12 which is provided with ground engaging flanges 22. The sliding member 12 is retained and guided by extensions 20 of the bars 25. The opposite side of the recess 26 is also enlarged forming shoulders 16 on the upper sides of the bars 25, said enlarged portion of the recess functioning as the guide for the enlarged head 15 of a bolt 14 which is threaded into a suitable socket in the sliding member 12. The head of the bolt abuts against the shoulders 16, preventing the sliding member from dropping downward, and said head is provided with a kerf by means of which the bolt 14 may be screwed into the sliding member 12 sufficiently to produce a light frictional contact between said member and the lower face of the recess in which it slides.

The chamber 26 is closed on the upper side of the horseshoe by a cover plate 18 which slides in suitable guideways being held in place by suitable means, not shown, and approaches so close to the head 15 of the bolt 14 that the latter can never become sufficiently unscrewed to work out of the sliding member 12. A spiral spring 17 lies within the chamber 26, between the bars 25, abutting at one end against the bolt 14 and at the other end against the end wall 27 of the horseshoe. The cover plate 18 is secured to the horseshoe in any suitable manner.

In operation the spring normally holds the sliding member 12 in forward position. When the horse starts to slip forward the flanges 22 dig into the slippery surface and hold, the forward movement of the horse's foot with the horseshoe being yieldably checked by the compression of the spiral spring. The lateral wings 22 of the slipper 12 may be provided with inclined surfaces, as shown in Figure 2 to increase the grip between the horseshoe and the ground.

While I have in the above description disclosed what I believe to be a practical embodiment of the invention, it is to be understood that details of construction may be varied to the extent permitted by the scope of the appended claims.

What I claim is:

1. A horseshoe having a recess in each end extending from one side to the other, one side of the recess being larger than the other forming an intermediate shoulder in said recess, a calk slidably mounted in said recess having a portion projecting from one side of the horseshoe and having a portion engaging said shoulder for retaining said calk, resilient means for yieldably mounting said calk, and a cover for the opposite side of said recess.

2. A non-skid horseshoe comprising a slipper arranged slidably within a groove in the horseshoe, a pin screwed into the slipper and provided with an enlarged head, guides for the head of the pin, a spring interposed between the pin and the bottom of the recess, and a slidable closure for the recess.

In testimony whereof I have signed my name to this specification.

FERDINANDO CARELLA. [L. S.]